(12) United States Patent
Seo et al.

(10) Patent No.: US 11,387,513 B2
(45) Date of Patent: Jul. 12, 2022

(54) PROTECTIVE COVER

(71) Applicant: Samsung Electronics Co., Ltd., Gyeonggi-do (KR)

(72) Inventors: Joo-Ho Seo, Seoul (KR); Dong-Hun Kim, Seoul (KR); Seon-Keun Park, Seoul (KR); Jin-Ie Ryu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 633 days.

(21) Appl. No.: 16/339,051

(22) PCT Filed: Sep. 18, 2017

(86) PCT No.: PCT/KR2017/010184
§ 371 (c)(1),
(2) Date: Apr. 3, 2019

(87) PCT Pub. No.: WO2018/066834
PCT Pub. Date: Apr. 12, 2018

(65) Prior Publication Data
US 2019/0237714 A1    Aug. 1, 2019

(30) Foreign Application Priority Data

Oct. 7, 2016 (KR) .......................... 10-2016-0129820

(51) Int. Cl.
| | |
|---|---|
| *H02J 7/00* | (2006.01) |
| *H01M 50/20* | (2021.01) |
| *G06F 1/16* | (2006.01) |
| *A45C 13/00* | (2006.01) |
| *H02J 7/02* | (2016.01) |

(Continued)

(52) U.S. Cl.
CPC .......... *H01M 50/20* (2021.01); *A45C 13/002* (2013.01); *A45C 13/1069* (2013.01); *G06F 1/16* (2013.01); *G06F 1/1633* (2013.01); *H02J 7/02* (2013.01); *H02J 7/025* (2013.01); *A45C 2011/002* (2013.01); *A45C 2011/003* (2013.01)

(58) Field of Classification Search
USPC ........................................... 320/108; 345/156
See application file for complete search history.

(56) References Cited

U.S. PATENT DOCUMENTS

| | | | |
|---|---|---|---|
| 2013/0076614 A1* | 3/2013 | Ive ...................... | H04M 1/0245 |
| | | | 345/156 |
| 2014/0111954 A1 | 4/2014 | Lee et al. | |

(Continued)

FOREIGN PATENT DOCUMENTS

| | | | |
|---|---|---|---|
| CN | 203896622 U | * | 10/2014 |
| KR | 10-2014-0042897 A | | 4/2014 |

(Continued)

*Primary Examiner* — Brian Ngo
(74) *Attorney, Agent, or Firm* — Cha & Reiter, LLC

(57) ABSTRACT

According to various embodiments of the present invention, a protective cover for protecting an electronic device comprises: a cover part; and a coupling part extending from the cover part, rotatably connected to the cover part, and detachably coupled to a part of the electronic device, wherein the coupling part rotates the cover part while being coupled to a part of the electronic device, so as to enable the cover part to cover at least one of a first and a second surface of the electronic device. In addition, various embodiments are possible.

14 Claims, 32 Drawing Sheets

(51) Int. Cl.
*A45C 13/10* (2006.01)
*A45C 11/00* (2006.01)

(56) References Cited

U.S. PATENT DOCUMENTS

2015/0365659 A1   12/2015   Han et al.
2016/0282955 A1    9/2016   Ko et al.

FOREIGN PATENT DOCUMENTS

| KR | 10-2014-0050504 A |   | 4/2014 |
|----|-------------------|---|--------|
| KR | 20150069522 A     | * | 6/2015 |
| KR | 10-2015-0099677 A |   | 9/2015 |
| KR | 10-2016-0113835 A |   | 10/2016 |
| WO | 2015/148590 A1    |   | 10/2015 |

* cited by examiner

PROTECTIVE COVER

CROSS-REFERENCE TO RELATED APPLICATION(S)

This application is a National Phase Entry of PCT International Application No. PCT/KR2017/010184, which was filed on Sep. 18, 2017, and claims priority to Korean Patent Application No. 10-2016-0129820, which was filed on Oct. 7, 2016, the content of each of which are incorporated herein by reference.

TECHNICAL FIELD

Various embodiments of the present invention relate to protection covers, e.g., protection covers to protect electronic devices.

BACKGROUND ART

Mobile communication terminals, MP3 players, portable multimedia players (PMPs), tablet PCs, and electronic book readers are among various electronic gadgets now available that allow their users to enjoy a diversity of media contents while carried in hand. Users may communicate with others while carrying portable electronic devices. Portable electronic devices include a display unit, an antenna device, an input/output device, and a data transmission/reception device. Portable electronic devices have various functions, including music and video playing, game playing, camera functionality, scheduling, and dictionary functionality, as well as their originally intended functions, to meet users' various needs as data communication technology sharply advances, and they also provide the functionality of adding new applications and data retrieval.

Electronic devices require a larger screen to allow users satisfactory use of multimedia services as well as voice call or text messaging services. However, a bigger screen of an electronic device may render it uncomfortable to carry the electronic device. Mobile communication terminals or other electronic devices may secure portability by being configured in a foldable manner. Equipping a foldable electronic device with a flexible display may provide a larger screen in the unfolded state while enhancing the portability of the electronic device.

An electronic device needs to be wrapped in a protection cover to be protected against breakage or damage due to scratches or impacts when used routinely.

DETAILED DESCRIPTION OF THE INVENTION

Technical Problem

A foldable electronic device may have a flexible display exposed through the front and rear surfaces thereof. When a flexible display is carried or used while being exposed through the front and rear surfaces of the electronic device, it is required to protect the flexible display from breakage or damage due to scratches or impacts.

According to various embodiments of the present invention, a protection cover protects both surfaces (e.g., front and rear surfaces) of the flexible display of the foldable electronic device.

According to various embodiments of the present invention, a protection cover protects an electronic device which may have a display exposed through both surfaces thereof, e.g., an electronic device with multiple 360-degree rotatable displays, as well as a foldable electronic device.

Technical Solution

According to various embodiments of the present invention, a protection cover configured to protect an electronic device comprises a cover part and a coupling part extending from the cover part, rotatably connected with the cover part, and detachably coupled to a portion of the electronic device, wherein the coupling part is configured to rotate the cover part while being coupled to a portion of the electronic device to cover one of, at least, a first surface, or at least, a second surface of the electronic device.

According to various embodiments of the present invention, a protection cover configured to protect an electronic device comprises a cover part and a coupling part extending from the cover part, rotatably connected with the cover part, and detachably coupled to a portion of the electronic device, wherein the coupling part includes a magnet configured to produce an attraction force with a magnetic member of the electronic device and a detachable member disposed adjacent both ends of the magnet and detachably coupled with the electronic device. The coupling part is configured to rotate the cover part while being coupled to a portion of the electronic device to cover one of, at least, a first surface, or at least, a second surface of the electronic device.

According to various embodiments of the present invention, a method of operating a protection cover may include the operations of coupling a coupling part to a portion of an electronic device, rotating a cover part with respect to the coupling part with the electronic device folded, and covering one of, at least, a first surface and, at least, a second surface of the electronic device with the cover part.

Advantageous Effects

According to various embodiments of the present invention, the protection cover may rotate the cover part as the coupling part is detachably coupled to a portion of the electronic device, thereby selectively protecting one of, at least, a first surface, or at least, a second surface (e.g., the front or rear surface of the electronic device) of the folded electronic device.

According to various embodiments of the present invention, the protection cover may include a detachable member (e.g., a suction plate) detachably coupled to the electronic device, as well as a magnet attached to or detached from the magnetic member of the electronic device and, thus, be more securely fastened to the electronic device.

Figure 1:
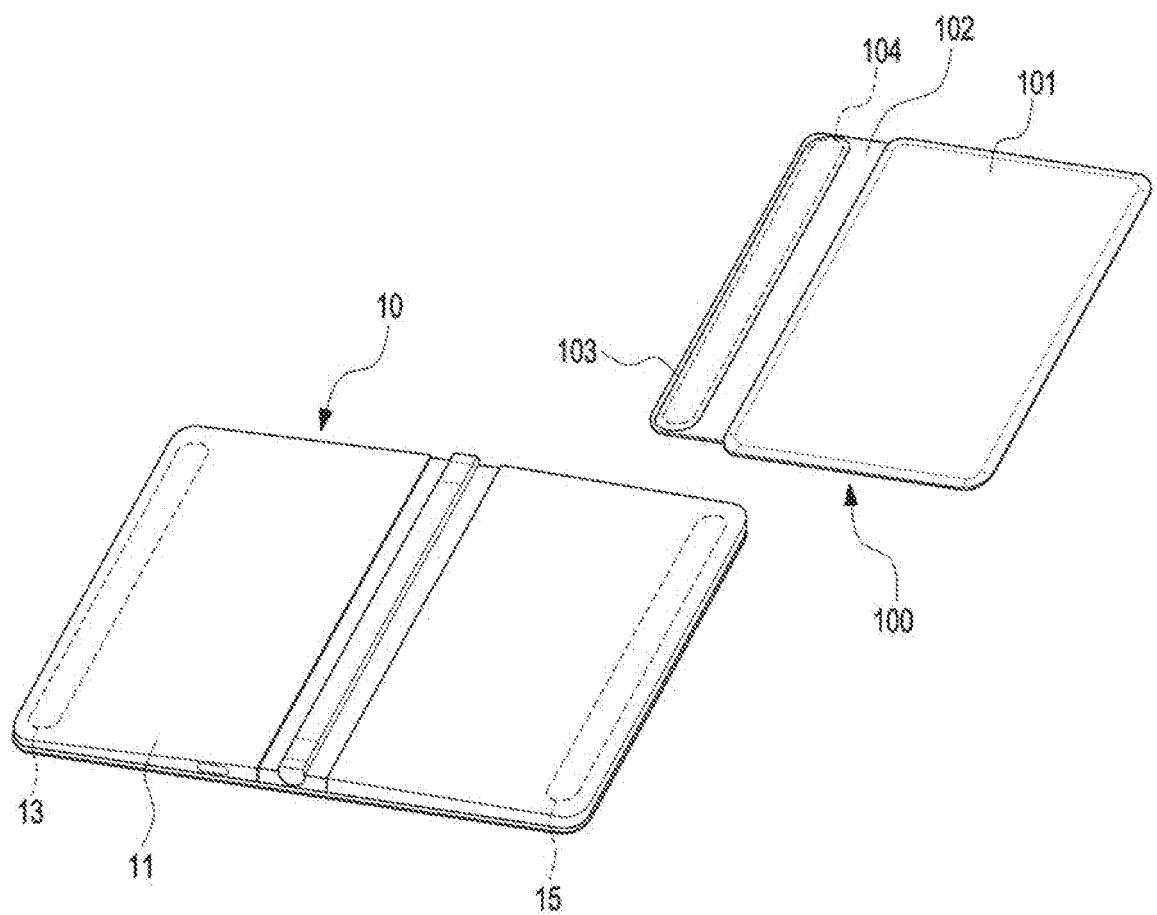
FIG. 1 is a perspective view illustrating a protection cover and an electronic device according to an embodiment of the present invention.

| | |
|---|---|
| 10: electronic device | 100: protection cover |
| 101: cover part | 102: connecting part |
| 103: coupling part | 104: magnet |
| 106: pogo pin | 107a, 107b: suction plate |

MODE FOR CARRYING OUT THE INVENTION

Hereinafter, embodiments of the present invention are described with reference to the accompanying drawings. However, it should be appreciated that the present invention is not limited to the embodiments, and all changes and/or equivalents or replacements thereto also belong to the scope of the present invention. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

Figure 2:
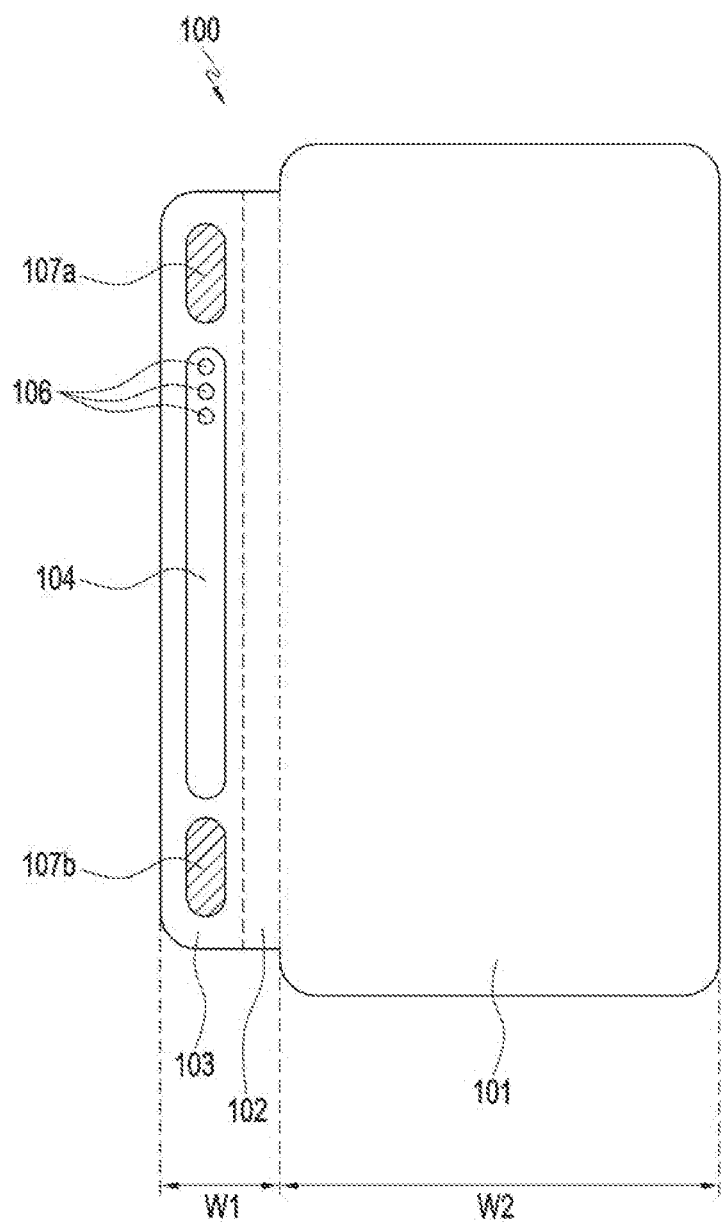
FIG. 2 is a front view illustrating a protection cover according to an embodiment of the present invention.

FIG. 1 is a perspective view illustrating a protection cover and an electronic device according to an embodiment of the present invention. FIG. 2 is a front view illustrating a protection cover according to an embodiment of the present invention.

Referring to FIGS. 1 and 2, according to an embodiment of the present invention, a protection cover 100 may cover and protect, at least, a first surface, or at least, a second surface 11 of an electronic device 10. The electronic device 10 may include the first surface where a screen-implemented display (not shown) is disposed, and the second surface 11 that is formed opposite the first surface. The display of the electronic device 10 may be formed of a flexible material, allowing the electronic device to be foldable. Magnetic bodies 13 and 15 may be mounted on edges of the second surface 11 of the electronic device 10. For example, the magnetic bodies 13 and 15 may be formed of magnets.

The protection cover 100 may include a cover part 101 and a coupling part 103 extending from the cover part 101. The cover part 101 may cover, at least, the first surface or, at least, the second surface 11 of the electronic device 10.

The coupling part 103 may include a connecting part 102, a magnet 104, detachable members 107a and 107b, and pogo pins 106. The connecting part 102 may extend from the cover part 101, rotatably connecting with the cover part 101. A first width W1 of the coupling part 103 may be smaller than a second width W2 of the cover part 101 so that the coupling part 103 may be attached to/detached from a portion (e.g., an edge of the electronic device 10) of the second surface of the electronic device 10.

The magnet 104 may be disposed along a lengthwise direction of the coupling part 103. The magnet 104 may be shaped as a bar smaller in length than the coupling part 103. According to various embodiments of the present invention, the magnet 104 is not limited as shaped as a bar and may be formed of a plurality of magnets arranged along the lengthwise direction of the coupling part 103. The magnet 104 may selectively couple with one of the magnetic bodies 13 and 15 of the electronic device 101.

The detachable members 107a and 107b may be attached onto the coupling part 103. The detachable members 107a and 107b may include suction plates 107a and 107b. The suction plates 107a and 107b may be disposed adjacent both ends of the magnet 104. The suction plates 107a and 107b may be attached to or detached from the second surface 11 of the electronic device 10. The suction plates 107a and 107b are described below in greater detail.

The pogo pins 106 may be arranged on the coupling part 103. The pogo pins 106 may be formed of an elastic structure. The pogo pins 106 may be disposed through a portion of the magnet. According to various embodiments of the present invention, the pogo pins 106 are not limited as disposed through a portion of the magnet but may be disposed in various positions on the coupling part 103. The pogo pins 106 may contact a terminal of the electronic device 10, electrically connecting the protection cover 100 with the electronic device 10. For example, in a case where the protection cover 100 includes an auxiliary battery (not shown), the auxiliary battery may electrically be connected with the electronic device 10 through the pogo pins 106.

According to various embodiments of the present invention, as there are provided the magnet 104 producing an attraction with the magnetic bodies 13 and 15 of the electronic device 10 and the suction plates 107a and 107b attached to or detached from the second surface 11 of the electronic device 10, the protection cover 100 may be coupled to or removed from the second surface 11 of the electronic device 10.

Figure 3:
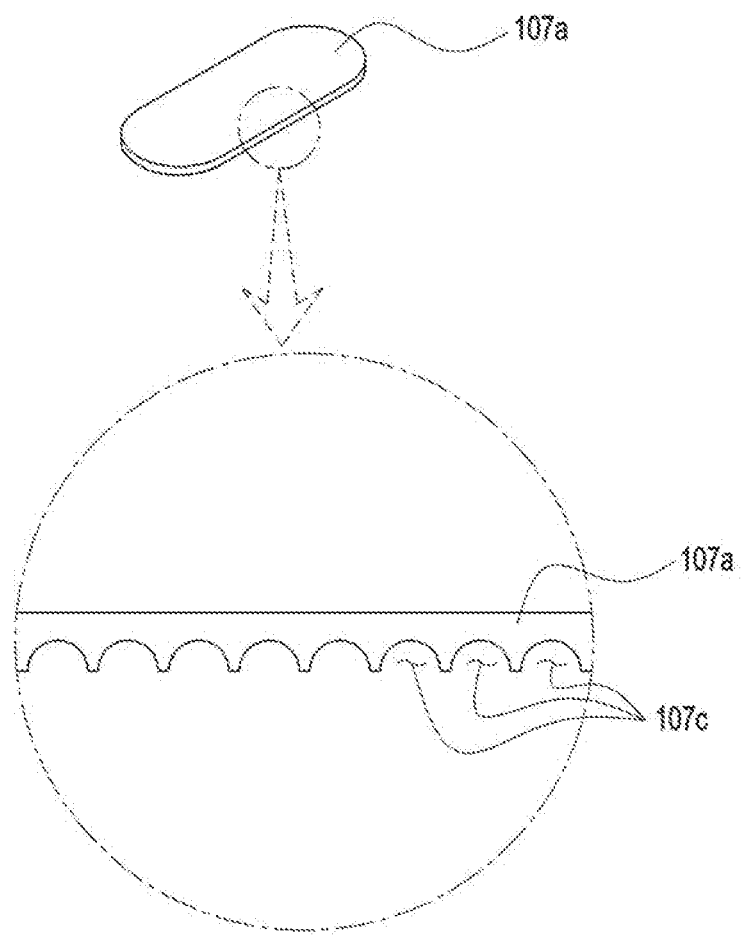
FIG. 3 is a view illustrating a suction plate of a protection cover according to an embodiment of the present invention.

FIG. 3 is a view illustrating a suction plate of a protection cover according to an embodiment of the present invention.

Referring to FIG. 3, according to an embodiment of the present invention, a plurality of holes 107c may be formed in one surface of the suction plate 107a of the protection cover. Another surface of the suction plate 107a may be attached onto the coupling part (103 of FIG. 2) of the protection cover using an adhesive. One surface of the suction plate 107a may be brought in contact and attached onto the second surface (11 of FIG. 1) of the electronic device.

According to various embodiments of the present invention, as the protection cover includes the suction plates (107a and 107b of FIG. 2) as well as the magnet 104 coupled with the second surface (11 of FIG. 1) of the electronic device, the protection cover may be more securely coupled onto the second surface (11 of FIG. 1) of the electronic device.

Figure 4:
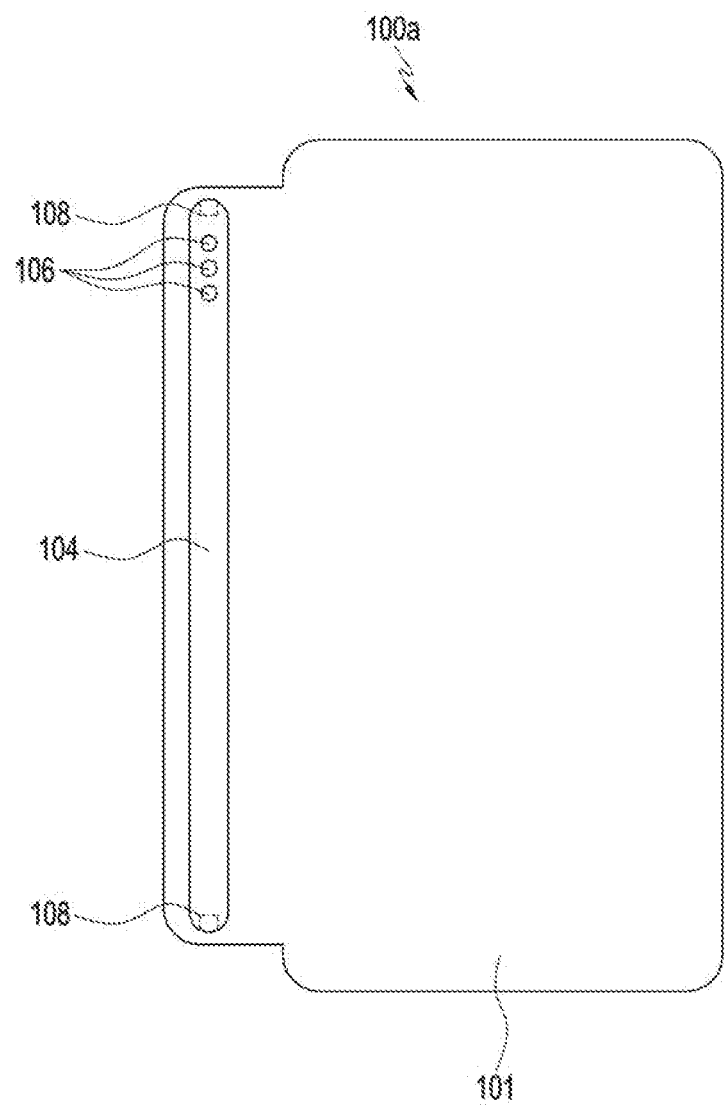
FIG. 4 is a front view illustrating a protection cover according to another embodiment of the present invention.
Figure 5:
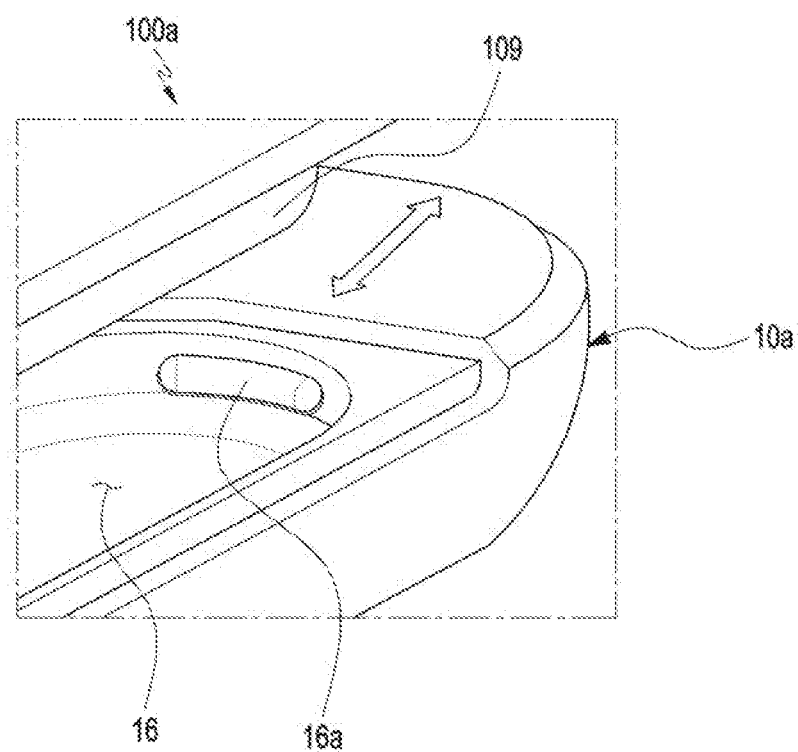
FIG. 5 is a perspective view illustrating a first insertion of a protection cover and a first groove of an electronic device according to another embodiment of the present invention.
Figure 6:
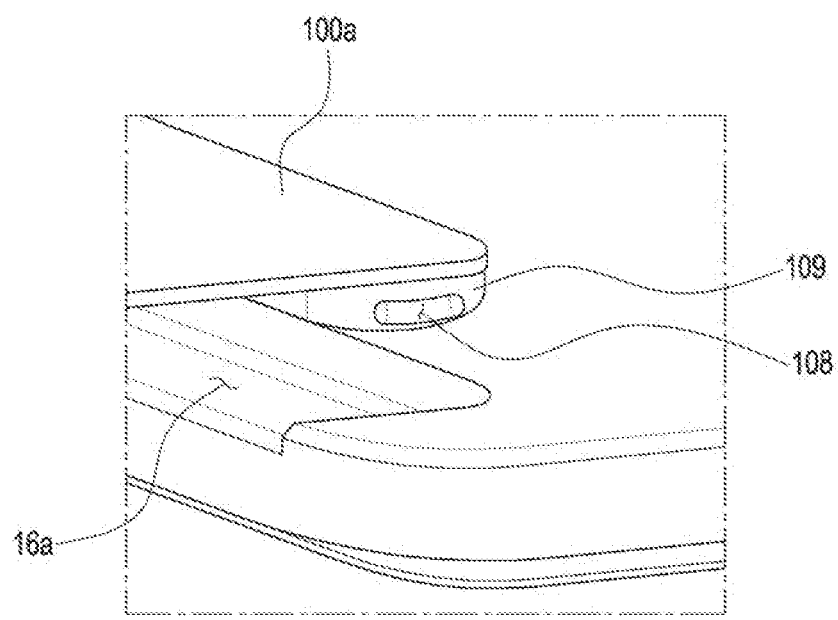
FIG. 6 is a perspective view illustrating a first insertion of a protection cover and a first groove of an electronic device as viewed at a different angle according to another embodiment of the present invention.
Figure 7:
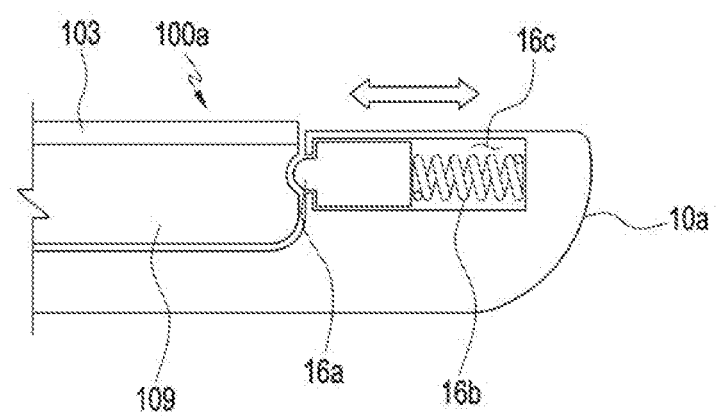
FIG. 7 is a cross-sectional view illustrating a coupling of a first insertion of a protection cover and a first groove of an electronic device according to another embodiment of the present invention.

FIG. 4 is a front view illustrating a protection cover according to another embodiment of the present invention. FIG. 5 is a perspective view illustrating a first insertion of a protection cover and a first groove of an electronic device according to another embodiment of the present invention. FIG. 6 is a perspective view illustrating a first insertion of a protection cover and a first groove of an electronic device as viewed at a different angle according to another embodiment of the present invention. FIG. 7 is a cross-sectional view illustrating a coupling of a first insertion of a protection cover and a first groove of an electronic device according to another embodiment of the present invention.

Referring to FIGS. 4 to 7, according to another embodiment of the present invention, a protection cover 100a may include a cover part 101 and a coupling part 103, wherein the same components as those in the prior embodiment are omitted from the description.

The coupling part 103 may include a magnet 104 and a detachable member 109. The detachable member 109 may include a first insertion 109 that projects on the coupling part 103.

For the coupling part 103 to couple with the electronic device 10a, the electronic device 10a may have a first groove 16 corresponding to the first insertion 109. A first locking part 16a may be formed in the first groove 16 to move back and forth in the first groove 16.

The first insertion 109 may have a first locking groove 108 to which the first locking part 16a of the electronic device is stuck. If the first insertion 109 is inserted to the first groove 16, the first locking part 16a may be stuck to the first locking groove 108 to tie or fasten the first insertion 109 into the first groove 16.

The electronic device 10a may have a receiving part to receive the first locking part 16a. The receiving part may have an elastic part 16b that provides an elastic force to the first locking part 16a. The elastic part 16b may provide an elastic force to the first locking part 16a, allowing the first locking part 16a to remain stuck to the first locking groove 108. In contrast, when the elastic part 16b contracts, the first locking part 16a may escape off the first locking groove 108, allowing the first insertion 109 to be removed from the first groove 16.

According to another embodiment of the present invention, as the protection cover 100a includes the first locking groove 108 to which the first locking part 16a of the electronic device is stuck, as well as the magnet 104 coupled with the second surface (FIG. 1) of the electronic device, the protection cover 100a may be more securely coupled onto the second surface (11 of FIG. 1) of the electronic device.

Figure 8:
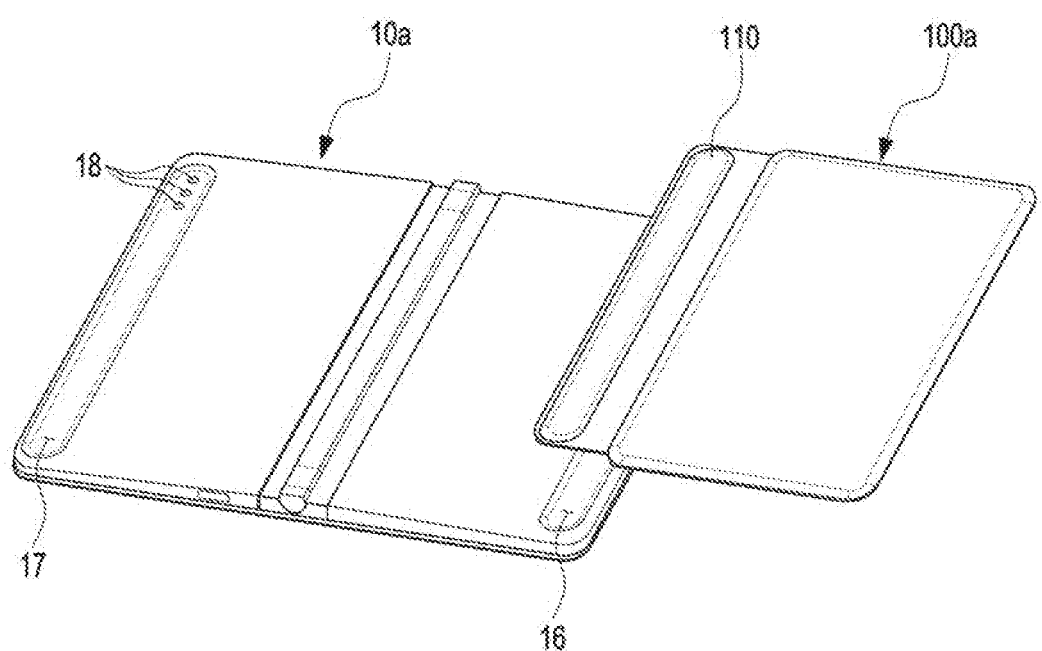
FIG. 8 is a perspective view illustrating a protection cover and an electronic device according to another embodiment of the present invention.
Figure 9:
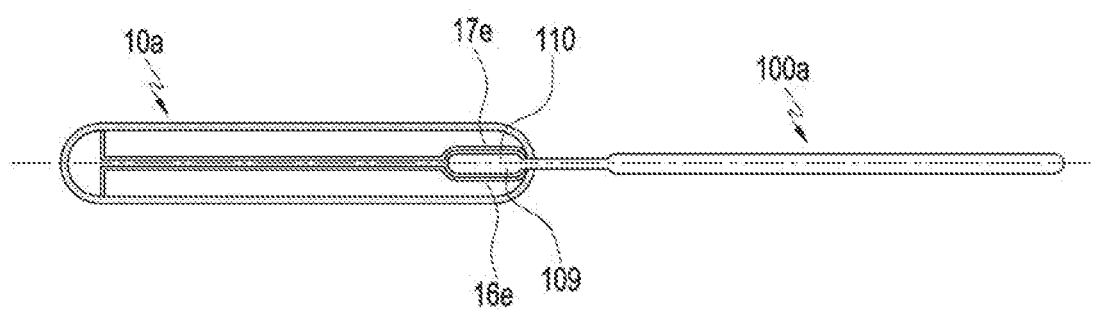
FIG. 9 is a cross-sectional view illustrating a coupling of a protection cover and an electronic device according to another embodiment of the present invention.

FIG. 8 is a perspective view illustrating a protection cover and an electronic device according to another embodiment of the present invention. FIG. 9 is a cross-sectional view illustrating a coupling of a protection cover and an electronic device according to another embodiment of the present invention.

Referring to FIGS. 8 and 9, according to another embodiment of the present invention, a protection cover 100a may include a first insertion 109 that is selectively inserted to one of a first groove 16 or a second groove 17 of the electronic device 10a. The second groove 17 may be formed in an opposite side of the first groove 16, with the middle of the electronic device 10a placed therebetween.

As the first insertion 109 is selectively inserted to one of the first groove 16 or the second groove 17, the protection cover 100a may be attached to or detached from one of the edges of the electronic device 10a.

A terminal 18 may be formed in the second groove 17 and be electrically connected with pogo pins (106 of FIG. 4) of the protection cover. Although not shown, a terminal may be formed in the first groove 16 and be electrically connected with the pogo pins (106 of FIG. 4).

According to another embodiment of the present invention, the protection cover 100a may further include a second insertion 110. The second insertion 110 may project in a direction opposite to the first insertion 109. In a case where the electronic device 10a is folded as shown in FIG. 9, the first insertion 109 may be inserted to the first groove 16 while the second insertion 110 may be inserted to the second groove 17. The first insertion 109 may contact a bottom surface 16e of the first groove 16. The second insertion 110 may contact a bottom surface 17e of the second groove 17. According to various embodiments of the present invention, the first insertion 109 may be inserted to the second groove 17, and the second insertion 110 may be inserted to the first groove 16.

According to another embodiment of the present invention, as the first and second insertions 109 and 110 remain inserted to the first and second grooves 16 and 17 in the folded state of the electronic device 10a, the protection cover 100a may remain fastened to the folded electronic device 10a.

Figure 10:
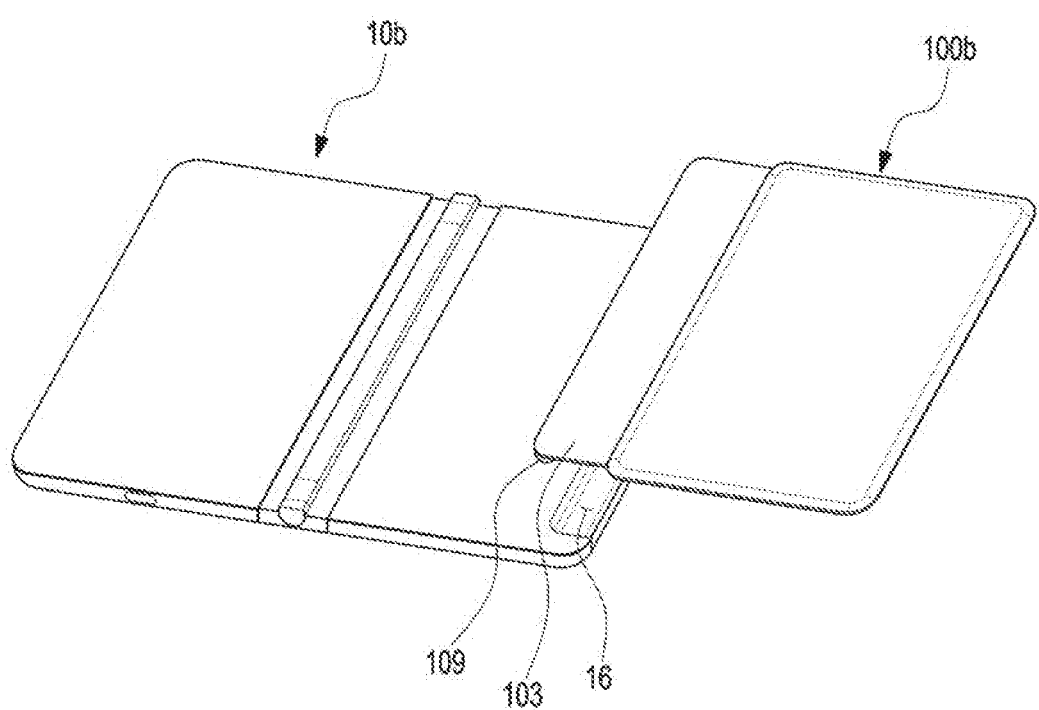
FIG. 10 is a perspective view illustrating a protection cover and an electronic device according to another embodiment of the present invention.
Figure 11:
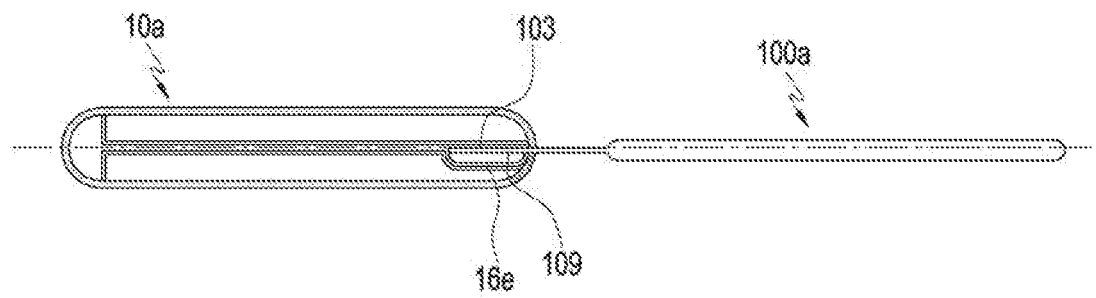
FIG. 11 is a cross-sectional view illustrating a coupling of a protection cover and an electronic device according to another embodiment of the present invention.

FIG. 10 is a perspective view illustrating a protection cover and an electronic device according to another embodiment of the present invention. FIG. 11 is a cross-sectional view illustrating a coupling of a protection cover and an electronic device according to another embodiment of the present invention.

Referring to FIGS. 10 and 11, according to another embodiment of the present invention, a protection cover 100b may include a first insertion 109 which is inserted to a first groove 16 of an electronic device 10b and may not include a second insertion (110 of FIG. 9).

In a case where the electronic device 10b is folded as shown in FIG. 11, as the insertion 109 remains inserted to the first groove 16, the protection cover 100b may remain fastened to the folded electronic device 10b.

Figure 12:
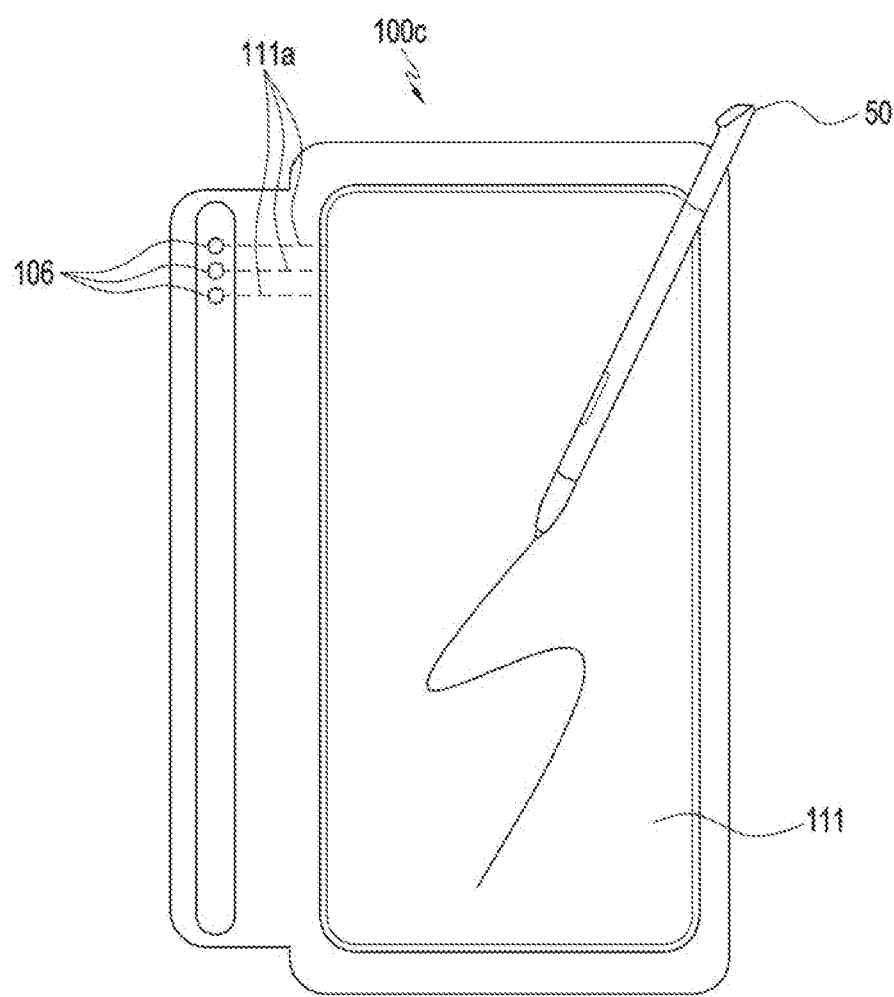
FIG. 12 is a front view illustrating a protection cover and a first input device according to another embodiment of the present invention.

FIG. 12 is a front view illustrating a protection cover and a first input device according to another embodiment of the present invention.

Referring to FIG. 12, according to another embodiment of the present invention, a protection cover 100c may include a second input device 111 to receive input signals through an electromagnetic resonance scheme with a first input device 50.

In a case where the user writes on the second input device 111 with the first input device 50, the second input device 111 may receive an input signal through electromagnetic resonance with the first input device 50.

The second input device 111 may be electrically connected with pogo pins 106 through connecting lines 111a. The pogo pins 106 may be electrically connected with a terminal of an electronic device (10 of FIG. 1), allowing the second input device 111 to transfer input signals to the electronic device (10 of FIG. 1).

Figure 13:
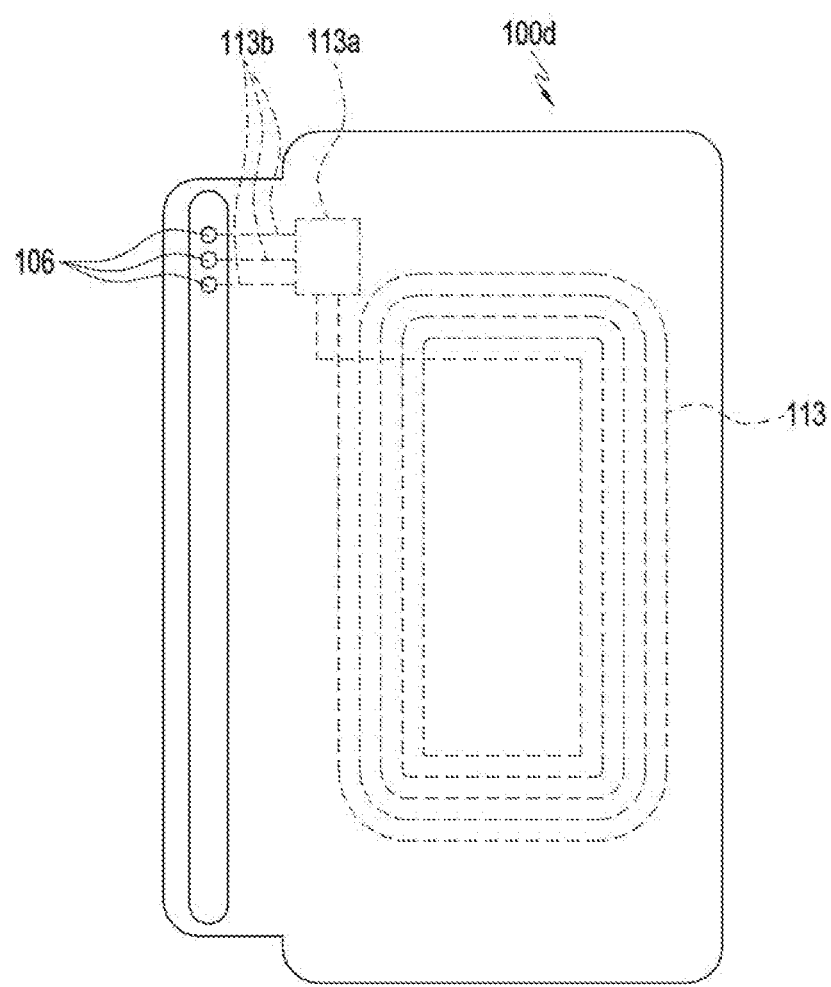
FIG. 13 is a front view illustrating a protection cover according to another embodiment of the present invention.

FIG. 13 is a front view illustrating a protection cover according to another embodiment of the present invention.

Referring to FIG. 13, according to another embodiment of the present invention, a protection cover 100d may include a wireless charging module 113.

The wireless charging module 113 may include a coil 113. The coil 113 may be shaped as a flat-type coil and be formed of a conductive material. For example, the coil 113 may be formed of metal. The coil 113 may produce an electric current through electromagnetic induction by an external wireless charger (not shown). The coil 113 may be electrically connected with pogo pins 106 through connecting lines 113b. The pogo pins 106 may be electrically connected with a terminal of the electronic device (10 of FIG. 1), allowing an electric current produced from the coil 113 to be transferred to the electronic device (10 of FIG. 1).

Figure 14:
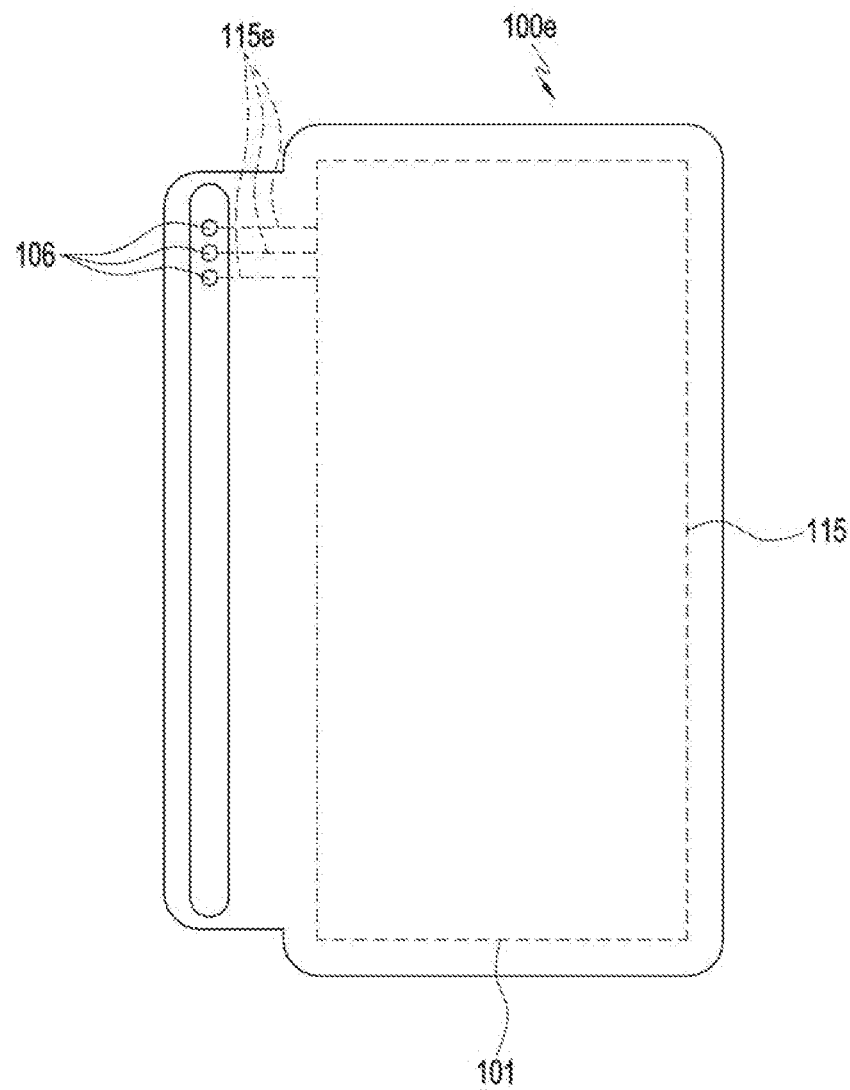
FIG. 14 is a front view illustrating a protection cover according to another embodiment of the present invention.

FIG. 14 is a front view illustrating a protection cover according to another embodiment of the present invention.

Figure 15:
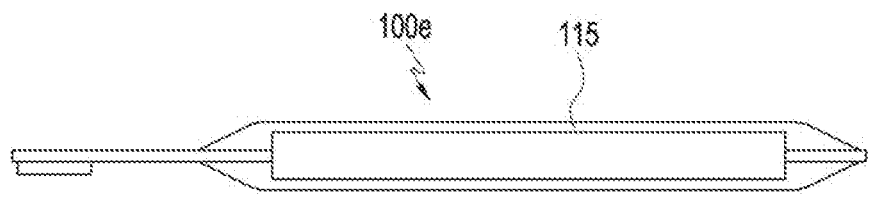
FIG. 15 is a cross-sectional view illustrating a protection cover according to another embodiment of the present invention.

FIG. 15 is a cross-sectional view illustrating a protection cover according to another embodiment of the present invention.

Referring to FIGS. 14 and 15, according to another embodiment of the present invention, a protection cover 100e may include an auxiliary battery 115.

The auxiliary battery 115 may be electrically connected with pogo pins 106 through connecting lines 115e. The pogo pins 106 may be electrically connected with a terminal of an electronic device (10 of FIG. 1), allowing the auxiliary battery 115 to supply power to the electronic device (10 of FIG. 1).

Figure 16:
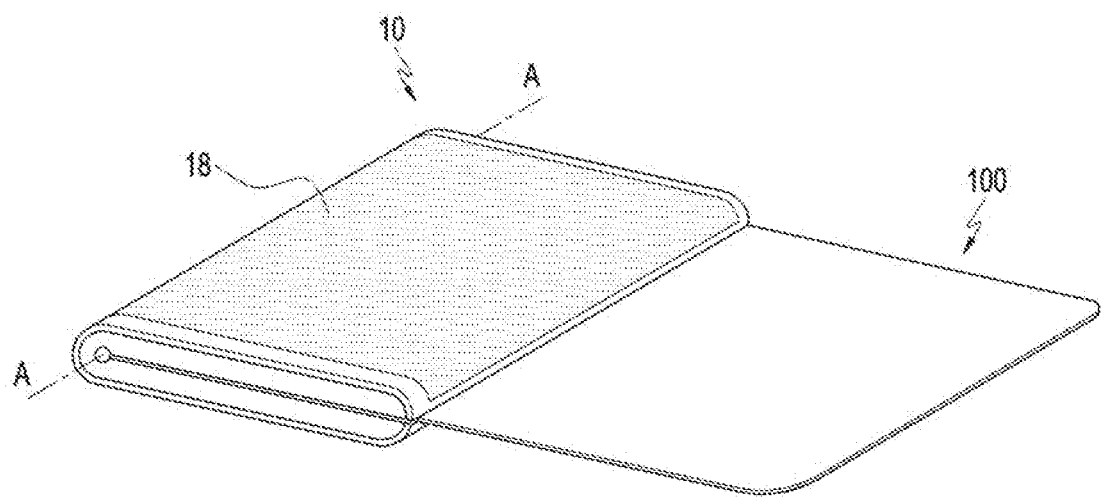
FIG. 16 is a perspective view illustrating a coupling of a protection cover and a folded electronic device according to various embodiments of the present invention.
Figure 17:
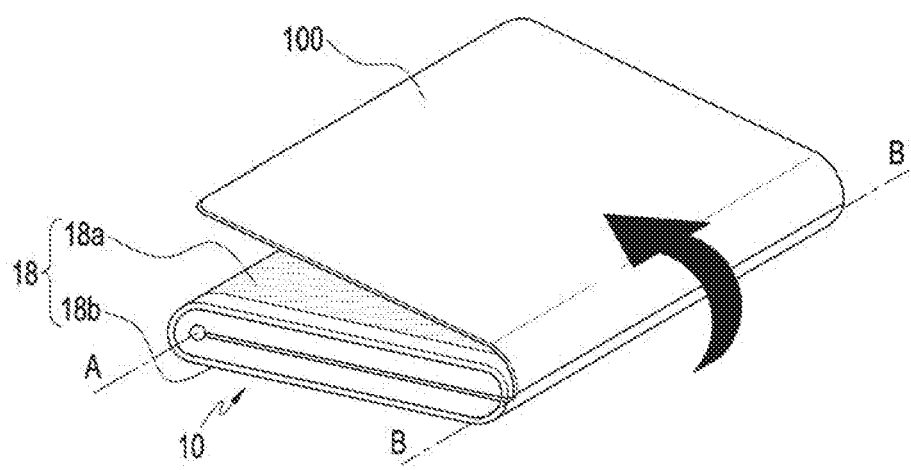
FIG. 17 is a perspective view illustrating a state in which a protection cover covers a first portion of a first surface of a folded electronic device according to various embodiments of the present invention.
Figure 18:
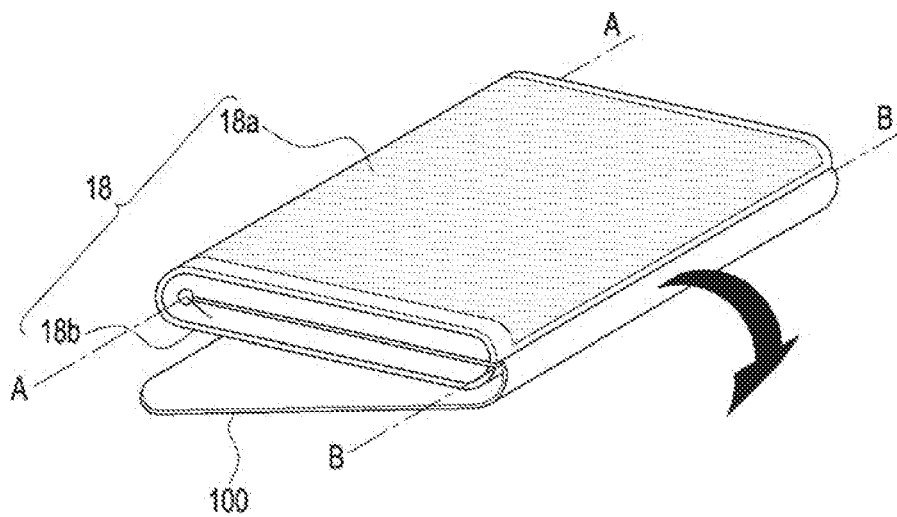
FIG. 18 is a perspective view illustrating a state in which a protection cover covers a second portion of a first surface of a folded electronic device according to various embodiments of the present invention.

FIG. 16 is a perspective view illustrating a coupling of a protection cover and a folded electronic device according to various embodiments of the present invention. FIG. 17 is a perspective view illustrating a state in which a protection cover covers a first portion of a first surface of a folded electronic device according to various embodiments of the present invention. FIG. 18 is a perspective view illustrating a state in which a protection cover covers a second portion of a first surface of a folded electronic device according to various embodiments of the present invention.

Referring to FIGS. 16 to 18, a process in which a protection cover is used for a folded electronic device is described according to various embodiments of the present invention. According to various embodiments of the present invention, the protection cover may be one of the protection cover 100 shown in FIG. 1, the protection cover 100a shown in FIG. 4, the protection cover 100b shown in FIG. 10, the protection cover 100d shown in FIG. 13, or the protection cover 100e shown in FIG. 14 and, for ease of description, the protection cover 100 shown in FIG. 1 is described as an example.

As shown in FIG. 16, the protection cover 100 may remain coupled to a portion of a folded electronic device 10. The electronic device 10 may be folded on a first axis A. The folded electronic device 10 may have a display 18 exposed to the outside. For example, a first surface 18 of the folded electronic device 10 may include a first portion which corresponds to the front surface of the electronic device 10 and a second portion which corresponds to the rear surface of the electronic device 10. The first surface 18 of the folded electronic device 10 may be simultaneously exposed through the front/rear surfaces of the electronic device 10.

As shown in FIG. 17, the protection cover 100 may be rotated on a second axis B which is parallel with the first axis A while being coupled to a portion of the folded electronic device 10. For example, the protection cover 100 may rotate about the second axis B, covering the first portion 18a of the first surface of the electronic device.

As shown in FIG. 18, the protection cover 100 may rotate about the second axis B, covering the second portion 18b of the first surface of the electronic device.

According to various embodiments of the present invention, the protection cover 100 may selectively cover at least the first surface 18 of the electronic device, e.g., one of the first portion 18a of the first surface or the second portion 18b of the first surface of the folded electronic device.

Figure 19:
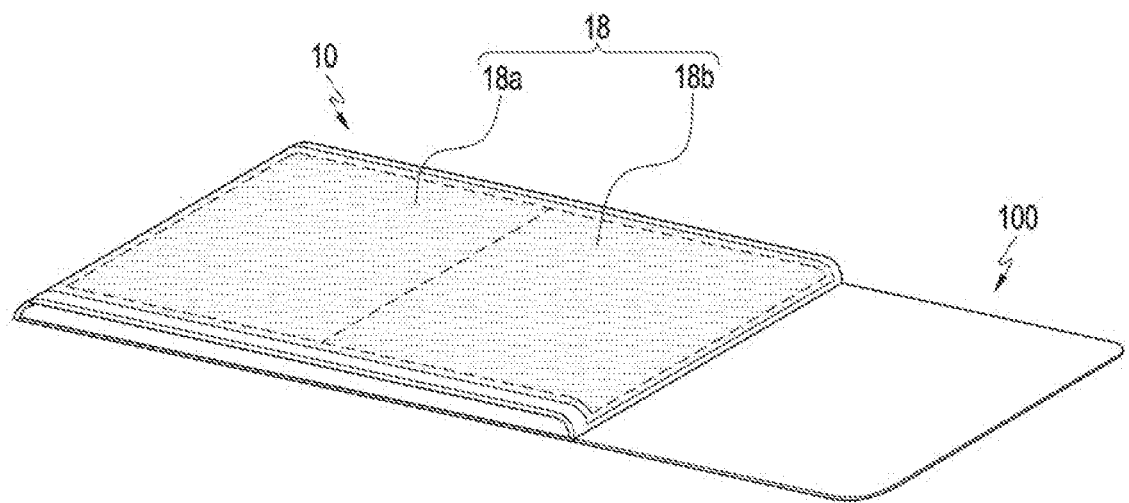
FIG. 19 is a perspective view illustrating a coupling of a protection cover and an unfolded electronic device according to various embodiments of the present invention.
Figure 20:
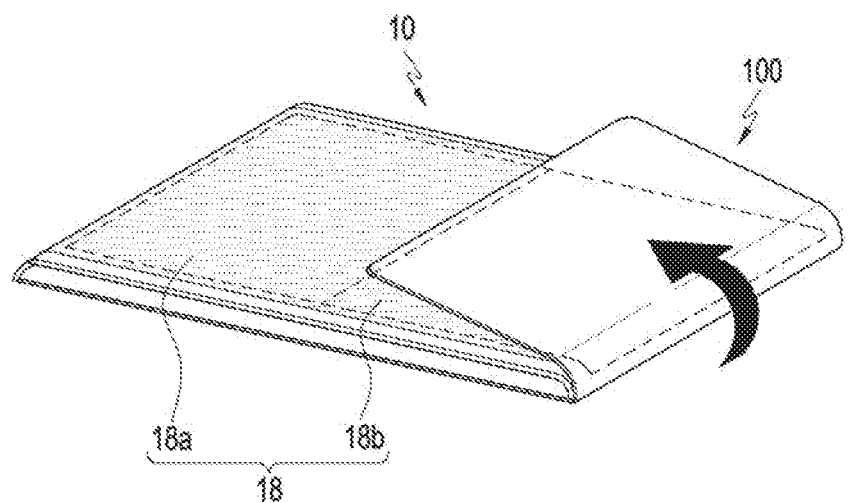
FIG. 20 is a perspective view illustrating a state in which a protection cover covers a portion of a first surface of an unfolded electronic device according to various embodiments of the present invention.
Figure 21:
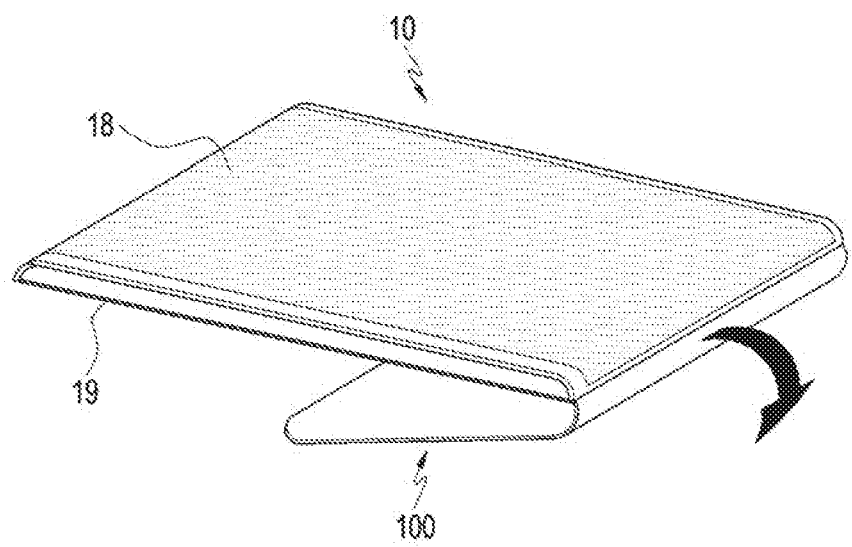
FIG. 21 is a perspective view illustrating a state in which a protection cover covers a portion of a second surface of an unfolded electronic device according to various embodiments of the present invention.
Figure 22:
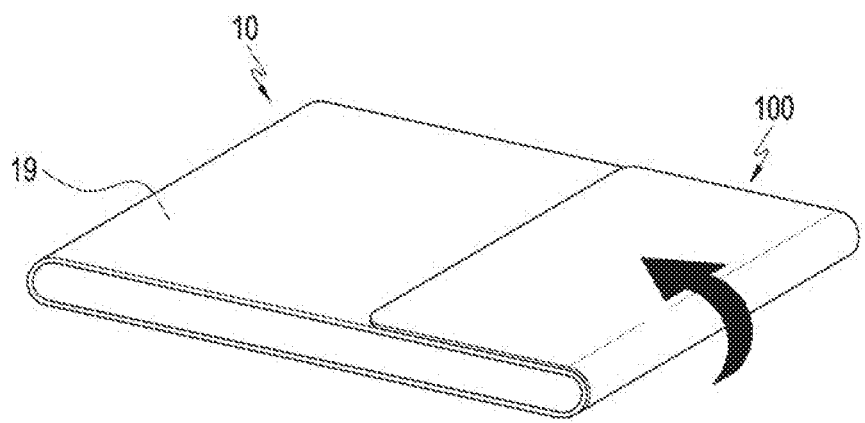
FIG. 22 is a perspective view illustrating a state in which a protection cover covers a portion of a second surface of an unfolded electronic device according to various embodiments of the present invention.

FIG. 19 is a perspective view illustrating a coupling of a protection cover and an unfolded electronic device according to various embodiments of the present invention. FIG. 20 is a perspective view illustrating a state in which a protection cover covers a portion of a first surface of an unfolded electronic device according to various embodiments of the present invention. FIG. 21 is a perspective view illustrating a state in which a protection cover covers a portion of a second surface of an unfolded electronic device according to various embodiments of the present invention. FIG. 22 is a perspective view illustrating a state in which a protection cover covers a portion of a second surface of an unfolded electronic device according to various embodiments of the present invention.

Referring to FIGS. 19 to 22, a process in which a protection cover 100 is used for an unfolded electronic device is described according to various embodiments of the present invention.

As shown in FIG. 19, the protection cover 100 may remain coupled to a portion of an unfolded electronic device 10.

As shown in FIG. 20, the protection cover 100 may rotate in one direction while being coupled to a portion of the unfolded electronic device 10, thereby covering a portion of a first surface (e.g., a second portion of the first surface) of the unfolded electronic device 10.

As shown in FIGS. 21 and 22, the protection cover 100 may rotate in a direction opposite the one direction while being coupled to a portion of the unfolded electronic device 10, thereby covering a portion of a second surface 19 of the unfolded electronic device 10.

Figure 23:
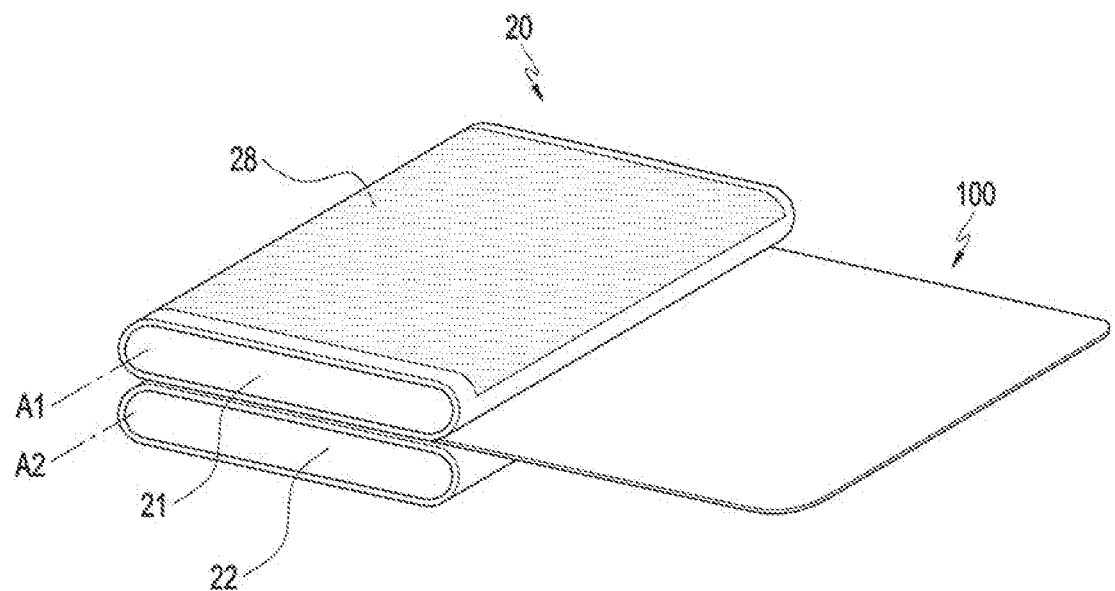
FIG. 23 is a perspective view illustrating a coupling of a protection cover and an electronic device with a folded dual-display according to various embodiments of the present invention.
Figure 24:
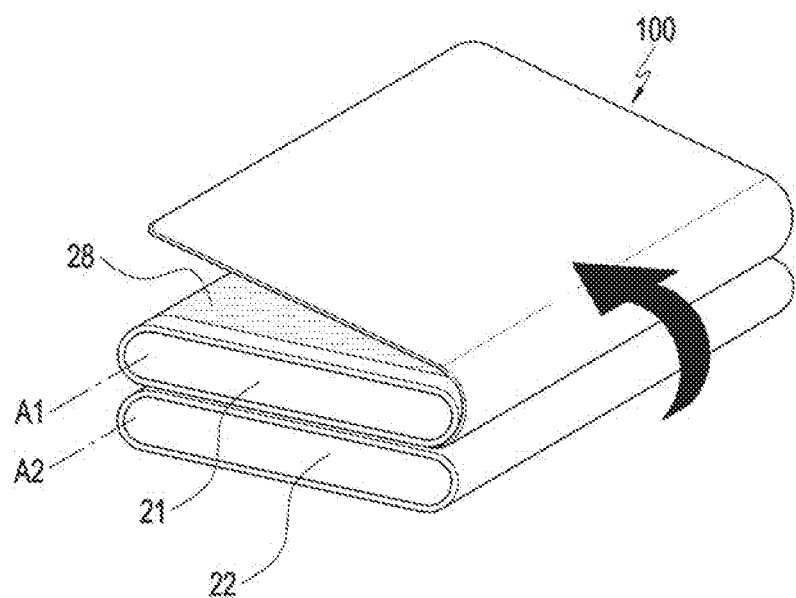
FIG. 24 is a perspective view illustrating a state in which a protection cover covers a first display of an electronic device with a folded dual-display according to various embodiments of the present invention.
Figure 25:
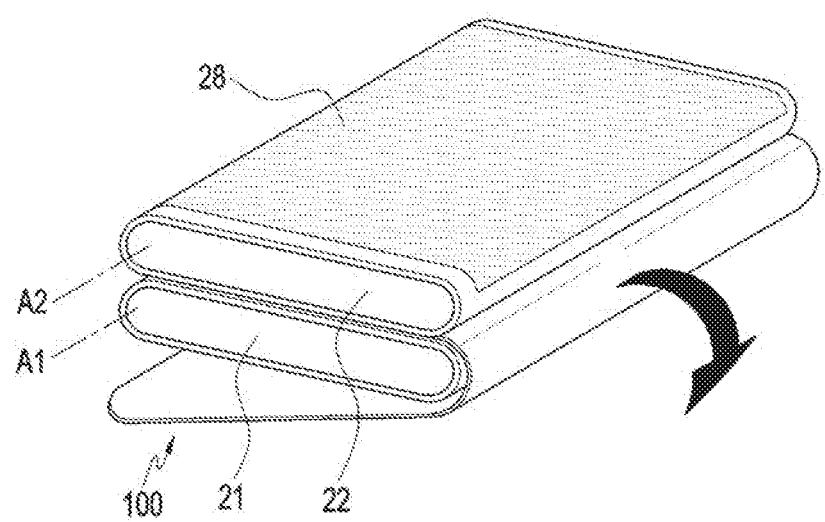
FIG. 25 is a perspective view illustrating a state in which a protection cover covers a second display of an electronic device with a folded dual-display according to various embodiments of the present invention.

FIG. 23 is a perspective view illustrating a coupling of a protection cover and an electronic device with a folded dual-display according to various embodiments of the present invention. FIG. 24 is a perspective view illustrating a state in which a protection cover covers a first display of an electronic device with a folded dual-display according to various embodiments of the present invention. FIG. 25 is a perspective view illustrating a state in which a protection cover covers a second display of an electronic device with a folded dual-display according to various embodiments of the present invention.

Referring to FIGS. 23 to 25, a process in which a protection cover is used for an electronic device with a foldable dual-display is described according to various embodiments of the present invention. The electronic device 20 with a dual-display may include a first housing 21, a second housing 22, a first display disposed on a first surface 28 of the first housing 21, and a second display disposed on a first surface (27 of FIG. 29) of the second housing 22. As the first housing 21 rotates about a first rotation axis A1, the second housing 22 may rotate about a second rotation axis A2, thereby allowing the first housing 21 and the second housing 22 to rotate relative to each other. For example, the second housing 22 may rotate with respect to the first housing 21 so that the first surface of the second housing 22 has an angle ranging from 0 degrees to 360 degrees with respect to the second surface of the first housing 21.

As shown in FIG. 23, the first housing 21 and the second housing 22 may be folded with respect to each other so that the first surface 28 of the first housing 21 is 360-degree angled with respect to the first surface (29 of FIG. 27) of the second housing 22.

The protection cover 100 may be coupled to a portion of the electronic device 20.

As shown in FIG. 24, the protection cover 100 may rotate in one direction while being coupled to a portion of the electronic device 20, thereby covering the first surface 28 of the first housing 21.

As shown in FIG. 25, the protection cover 100 may rotate in a direction opposite to the one direction while being coupled to a portion of the electronic device 20, thereby covering the first surface (29 of FIG. 27) of the second housing 21.

According to various embodiments of the present invention, the protection cover 100 may selectively cover at least the first surface 18 of the electronic device, e.g., one of the first surface 28 of the first housing 21 or the first surface (29 of FIG. 27) of the second housing 22.

Figure 26:
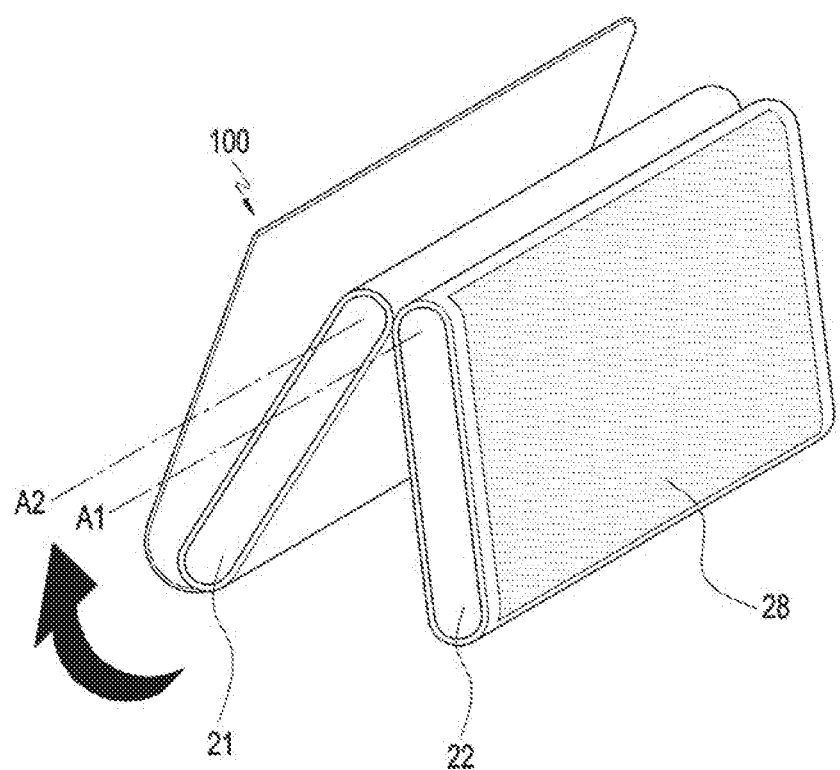
FIG. 26 is a perspective view illustrating a state in which a protection cover covers a second display of a mounted electronic device according to various embodiments of the present invention.

FIG. 26 is a perspective view illustrating a state in which a protection cover covers a second display of a mounted electronic device according to various embodiments of the present invention.

Referring to FIG. 26, according to various embodiments of the present invention, the protection cover 100 may cover a first surface (29 of FIG. 27) of the second housing 22 while an electronic device is mounted. While the user views video or movie through the display of the first surface 28 of the first housing 21 with the electronic device mounted, the first surface 29 of the second housing 22 may be protected by the protection cover 100.

Figure 27:
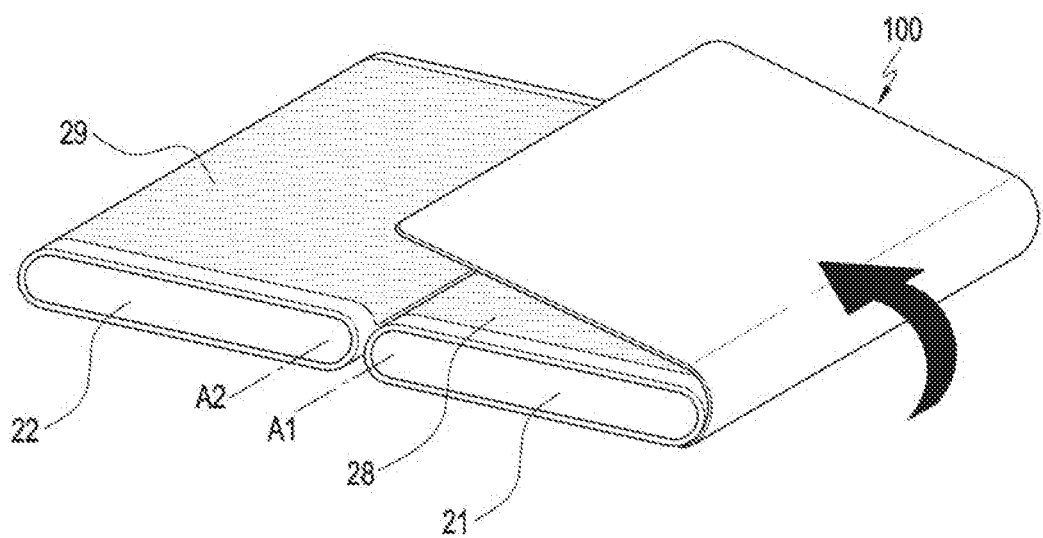
FIG. 27 is a perspective view illustrating a state in which a protection cover covers a first display of an unfolded electronic device according to various embodiments of the present invention.
Figure 28:
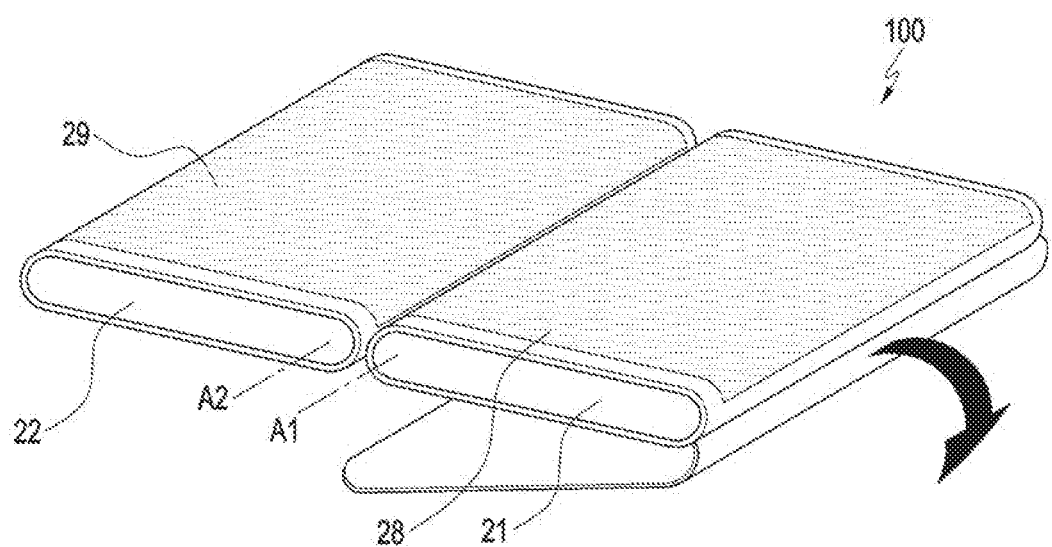
FIG. 28 is a perspective view illustrating a state in which a protection cover covers a portion of a second surface of an unfolded electronic device according to various embodiments of the present invention.
Figure 29:
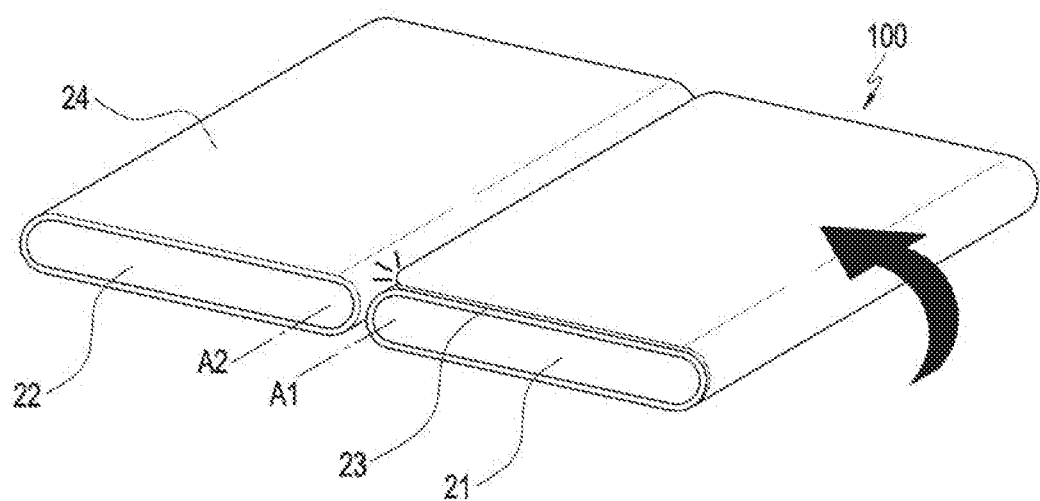
FIG. 29 is a perspective view illustrating a state in which a protection cover covers a portion of a second surface of an unfolded electronic device according to various embodiments of the present invention.

FIG. 27 is a perspective view illustrating a state in which a protection cover covers a first display of an unfolded electronic device according to various embodiments of the present invention. FIG. 28 is a perspective view illustrating a state in which a protection cover covers a second surface of an unfolded electronic device according to various embodiments of the present invention. FIG. 29 is a perspective view illustrating a state in which a protection cover covers a portion of a second surface of an unfolded electronic device according to various embodiments of the present invention.

Referring to FIGS. 27 to 29, an electronic device may be rotated so that an angle between a first surface 28 of the first housing 21 and a first surface 29 of the second housing 22 is 180 degrees.

As shown in FIG. 27, according to various embodiments of the present invention, the protection cover 100 may rotate in one direction while being coupled to a portion of the electronic device, thereby covering a first display disposed on the first surface 28 of the first housing 22.

As shown in FIGS. 28 and 29, the protection cover 100 may rotate in a direction opposite to the one direction while being coupled to a portion of the electronic device, thereby covering the second surface 23 of the first housing 22.

Figure 30:
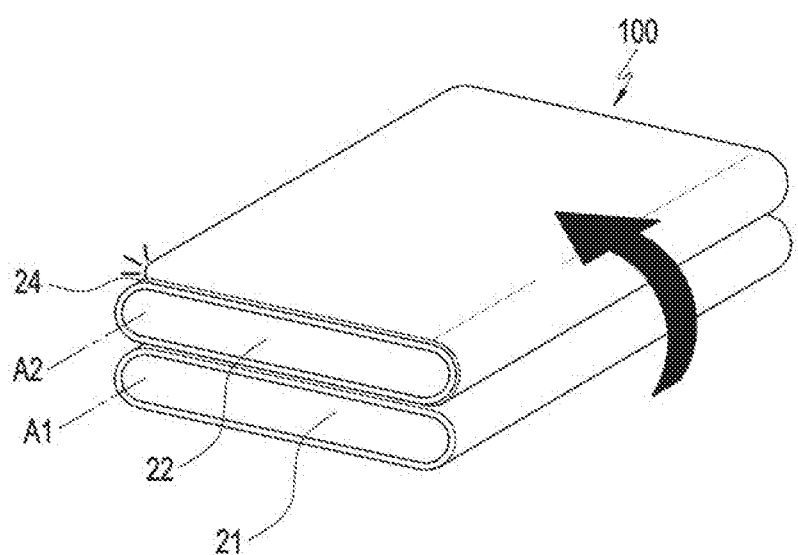
FIG. 30 is a perspective view illustrating a state in which a protection cover covers a first portion of a second surface of an electronic device folded to allow a first display and a second display to face each other according to various embodiments of the present invention.
Figure 31:
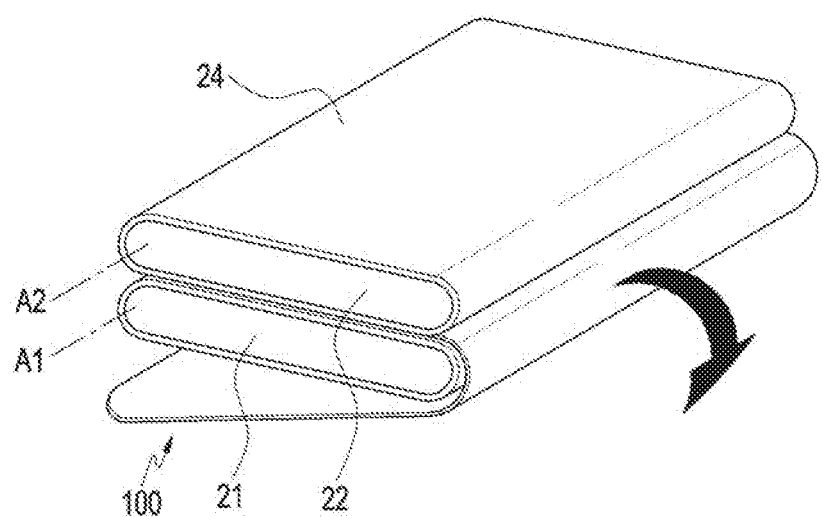
FIG. 31 is a perspective view illustrating a state in which a protection cover covers a second portion of a second surface of an electronic device folded to allow a first display and a second display to face each other according to various embodiments of the present invention.

FIG. 30 is a perspective view illustrating a state in which a protection cover covers a second surface of a second housing of an electronic device folded to allow a first display and a second display to face each other according to various embodiments of the present invention. FIG. 31 is a perspective view illustrating a state in which a protection cover covers a second surface of a first housing of an electronic device folded to allow a first display and a second display to face each other according to various embodiments of the present invention.

Referring to FIGS. 30 and 31, the electronic device may be folded so that an angle between the first surface of the first housing 21 and the first surface of the second housing 22 is 0 degrees. For example, the first display on the first surface of the first housing 21 may face the second display on the first surface of the second housing 22.

As shown in FIG. 30, the protection cover 100 may rotate in one direction while being coupled to a portion of the electronic device, thereby covering the second surface 24 of the second housing 22.

As shown in FIG. 31, the protection cover 100 may rotate in a direction opposite to the one direction while being coupled to a portion of the electronic device, thereby covering the second surface (23 of FIG. 29) of the first housing 21.

Figure 32:
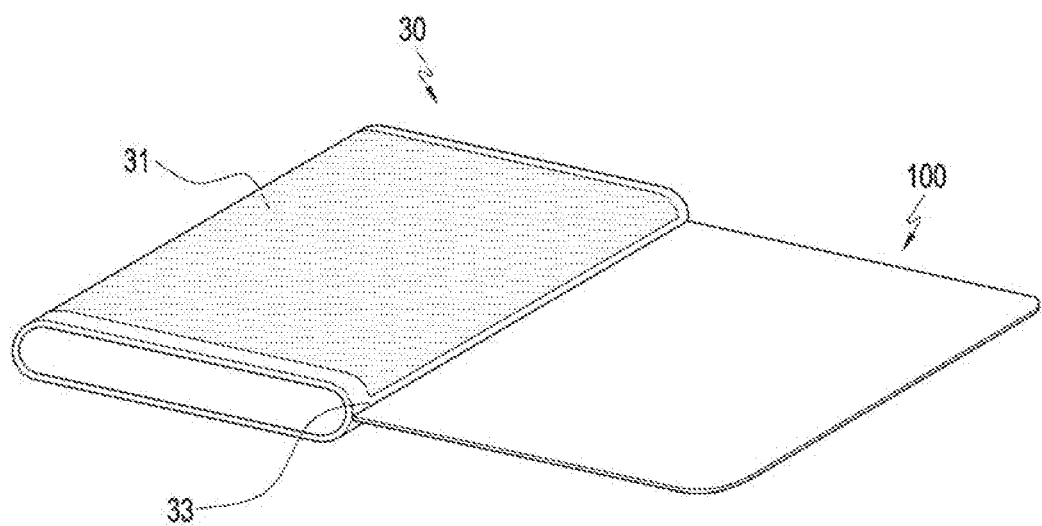
FIG. 32 is a perspective view illustrating a coupling of a protection cover and a cylindrical electronic device according to various embodiments of the present invention.
Figure 33:
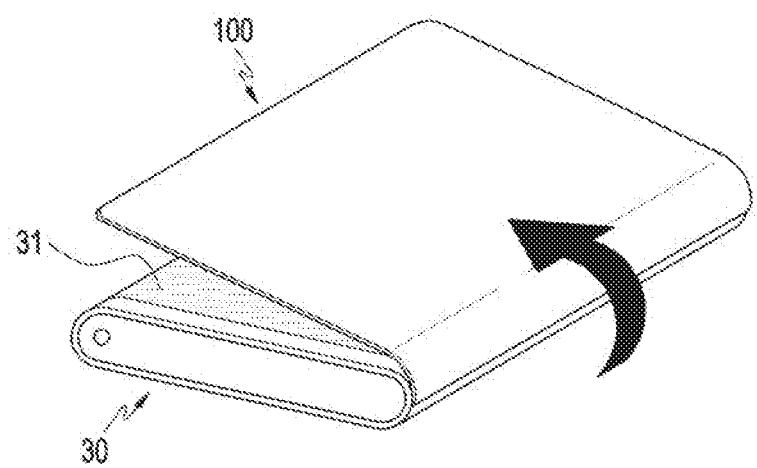
FIG. 33 is a perspective view illustrating a state in which a protection cover covers a first surface of a cylindrical electronic device according to various embodiments of the present invention.
Figure 34:
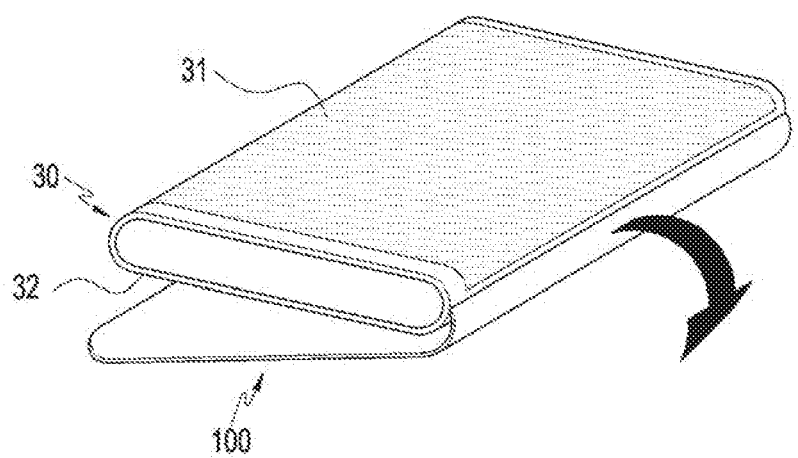
FIG. 34 is a perspective view illustrating a state in which a protection cover covers a second surface of a cylindrical electronic device according to various embodiments of the present invention.

FIG. 32 is a perspective view illustrating a coupling of a protection cover and a cylindrical electronic device according to various embodiments of the present invention. FIG. 33 is a perspective view illustrating a state in which a protection cover covers a first surface of a cylindrical electronic device according to various embodiments of the present invention. FIG. 34 is a perspective view illustrating a state in which a protection cover covers a second surface of a cylindrical electronic device according to various embodiments of the present invention.

Referring to FIGS. 32 to 34, a process in which a protection cover is used for a cylindrical electronic device is described according to various embodiments of the present invention. The cylindrical electronic device 30 may include a display 31 that surrounds the front surface (e.g., the first surface 31 of the electronic device), side surfaces, and the rear surface (e.g., the second surface 32 of the electronic device) of the electronic device. The display 31 may be disposed in a cylindrical shape on the electronic device 30.

As shown in FIG. 32, according to various embodiments of the present invention, the protection cover 100 may be coupled to a portion of the electronic device 30.

As shown in FIG. 33, the protection cover 100 may rotate in one direction while being coupled to a portion of the electronic device 30, thereby covering the first surface 31 of the electronic device.

As shown in FIG. 34, the protection cover 100 may rotate in a direction opposite to the one direction while being coupled to a portion of the electronic device 30, thereby covering the second surface 32 of the electronic device.

Figure 35:
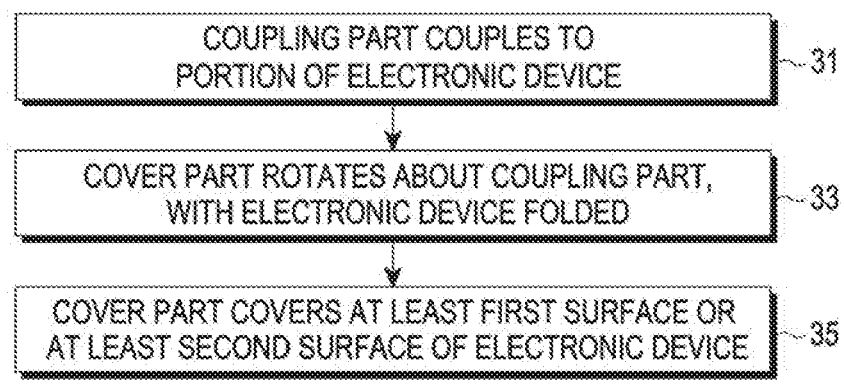
FIG. 35 is a flowchart illustrating a method of operating a protection cover according to various embodiments of the present invention.

FIG. 35 is a flowchart illustrating a method of operating a protection cover according to various embodiments of the present invention.

Referring to FIG. 35, according to various embodiments of the present invention, in a method of operating a protection cover, a coupling part may be coupled to a portion of an electronic device in operation 31, a cover part may be rotated with respect to the coupling part with the electronic device folded in operation 33, and the cover part may selectively cover one of, at least, a first surface and, at least, a second surface of the electronic device in operation 35.

According to various embodiments of the present invention, a protection cover configured to protect an electronic device comprises a cover part and a coupling part extending from the cover part, rotatably connected with the cover part, and detachably coupled to a portion of the electronic device, wherein the coupling part is configured to rotate the cover part while being coupled to a portion of the electronic device to cover one of, at least, a first surface, or at least, a second surface of the electronic device.

According to various embodiments of the present invention, the coupling part may include a magnet attached to or detached from the electronic device.

According to various embodiments of the present invention, the coupling part may further include a suction plate attached to or detached from the electronic device.

According to various embodiments of the present invention, the coupling part may further include a first insertion inserted to a first groove formed in the electronic device.

According to various embodiments of the present invention, the first insertion may include a first locking groove to which a first locking part of the electronic device is stuck, and the first locking groove is configured to allow the first locking part to be stuck thereto to tie and fasten the first insertion into the first groove.

According to various embodiments of the present invention, a protection cover configured to protect an electronic device comprises a cover part and a coupling part extending from the cover part, rotatably connected with the cover part, and detachably coupled to a portion of the electronic device, wherein the coupling part includes a magnet configured to produce an attraction force with a magnetic member of the electronic device and a detachable member disposed adjacent both ends of the magnet and detachably coupled with the electronic device. The coupling part is configured to rotate the cover part while being coupled to a portion of the electronic device to cover one of, at least, a first surface, or at least, a second surface of the electronic device.

According to various embodiments of the present invention, a first width of the coupling part may be smaller than a second width of the cover part.

According to various embodiments of the present invention, a portion of the electronic device may be an edge of a second surface of the electronic device or a side surface of the electronic device.

According to various embodiments of the present invention, the electronic device may include a foldable housing and a flexible display disposed on the housing or include a 360-degree rotatable dual-display.

According to various embodiments of the present invention, the housing is configured to be rotated and folded with respect to a first axis, and the cover part is configured to be be rotated with respect to a second axis parallel with the first axis.

According to various embodiments of the present invention, the detachable member may include a suction plate attached to or detached from the electronic device.

According to various embodiments of the present invention, the detachable member may further include a first insertion inserted to a first groove formed in the electronic device.

According to various embodiments of the present invention, the first insertion may include a first locking groove to which a first locking part of the electronic device is stuck, and the first locking groove is configured to allow the first locking part to be stuck thereto to tie and fasten the first insertion into the first groove.

According to various embodiments of the present invention, the electronic device may include a second groove formed on an opposite side of a middle of a second surface of the electronic device. The first insertion may be selectively inserted to at least one of the first groove or the second groove.

According to various embodiments of the present invention, in a case where the first insertion is inserted to one of the first groove or the second groove of the electronic device with the electronic device folded, the detachable member may include a second insertion inserted to the other of the first groove or the second groove.

According to various embodiments of the present invention, the protection cover may further include an auxiliary battery and a pogo pin electrically connected with a terminal of the electronic device and the auxiliary battery.

According to various embodiments of the present invention, the protection cover may further include a wireless charging module and a pogo pin electrically connected with a terminal of the electronic device.

According to various embodiments of the present invention, there may further be included a second input device receiving an input signal through an electromagnetic resonance scheme with a first input device and a pogo pin electrically connected with a terminal of the electronic device.

According to various embodiments of the present invention, a method of operating a protection cover may include the operations of coupling a coupling part to a portion of an electronic device, rotating a cover part with respect to the coupling part with the electronic device folded, and covering one of, at least, a first surface and, at least, a second surface of the electronic device with the cover part.

According to various embodiments of the present invention, a method of operating a protection cover may include the operation of covering one of, at least, a first surface or, at least, a second surface of an electronic device as the cover part is rotated with respect to the coupling part, with the electronic device unfolded.

According to various embodiments of the present invention, in a method of operating the protection cover, the cover part is rotated with respect to the coupling part in a state rotated so that the angle between the first surface of the first housing of the electronic device and the first surface of the second housing is 0 degrees, thereby covering one of a second portion of the second surface of the second housing or the second surface of the first housing.

According to various embodiments of the present invention, in a method of operating the protection cover, the cover part is rotated with respect to the coupling part in a state rotated so that the angle between the first surface of the first housing of the electronic device and the first surface of the second housing is 180 degrees, thereby covering one of the first surface of the first housing or the second surface of the first housing of the electronic device.

According to various embodiments of the present invention, in a method of operating the protection cover, the cover part is rotated with respect to the coupling part in a state rotated so that the angle between the first surface of the first housing of the electronic device and the first surface of the second housing is 360 degrees, thereby covering one of the first surface of the first housing or the first surface of the second housing of the electronic device.

While the present invention has been shown and described with reference to exemplary embodiments thereof, it will be apparent to those of ordinary skill in the art that various changes in form and detail may be made thereto without departing from the spirit and scope of the present invention as defined by the following claims.

The invention claimed is:

1. A protection cover configured to protect an electronic device, the protection cover comprising:
   a cover part; and
   a coupling part extending from the cover part, rotatably connected with the cover part, and detachably coupled to a portion of the electronic device,
   wherein the coupling part is configured to rotate the cover part while being coupled to the portion of the electronic device to selectively cover one of, at least, a first surface facing in a first direction, or at least, a second surface facing in a second direction opposite to the first direction of the electronic device,
   wherein the portion of the electronic device is an edge of a second surface of the electronic device or a side surface of the electronic device.

2. The protection cover of claim 1, wherein the coupling part includes a magnet attached to or detached from the electronic device.

3. The protection cover of claim 2, wherein the coupling part further includes a suction plate attached to or detached from the electronic device.

4. The protection cover of claim 2, wherein the coupling part further includes a first insertion inserted to a first groove formed in the electronic device.

5. The protection cover of claim 4, wherein the first insertion includes a first locking groove to which a first locking part of the electronic device is stuck, and wherein the first locking groove is configured to allow the first locking part to be stuck thereto to tie and fasten the first insertion into the first groove.

6. A protection cover configured to protect an electronic device, the protection cover comprising:
a cover part; and
a coupling part extending from the cover part, rotatably connected with the cover part, and detachably coupled to a portion of the electronic device,
wherein the coupling part includes:
a magnet configured to produce an attraction force with a magnetic member of the electronic device and,
a detachable member disposed adjacent both ends of the magnet and detachably coupled with the electronic device, and
wherein the coupling part is configured to rotate the cover part while being coupled to the portion of the electronic device to selectively cover one of, at least, a first surface facing in a first direction, or at least, a second surface facing in a second direction opposite to the first direction of the electronic device,
wherein the portion of the electronic device is an edge of a second surface of the electronic device or a side surface of the electronic device.

7. The protection cover of claim 6, wherein a first width of the coupling part is smaller than a second width of the cover part.

8. The protection cover of claim 6, wherein the electronic device includes a foldable housing and a flexible display disposed on the housing or includes a 360-degree rotatable dual-display.

9. The protection cover of claim 8, wherein the housing is configured to be rotated and folded with respect to a first axis, and
wherein the cover part is configured to be rotated with respect to a second axis parallel with the first axis.

10. The protection cover of claim 6, wherein the detachable member includes a suction plate attached to or detached from the electronic device.

11. The protection cover of claim 6, wherein the detachable member includes a first insertion inserted to a first groove formed in the electronic device.

12. The protection cover of claim 11, wherein the first insertion includes a first locking groove to which a first locking part of the electronic device is stuck, and
wherein the first locking groove is configured to allow the first locking part to be stuck thereto to tie and fasten the first insertion into the first groove.

13. The protection cover of claim 11, wherein the electronic device includes a second groove formed on an opposite side of a middle of a second surface of the electronic device, and
wherein the first insertion is selectively inserted to at least one of the first groove or the second groove.

14. The protection cover of claim 13, wherein in a case where the first insertion is inserted to one of the first groove or the second groove of the electronic device with the electronic device folded, the detachable member includes a second insertion inserted to the other of the first groove or the second groove.

* * * * *